United States Patent [19]
Goodwin

[11] 3,988,139
[45] Oct. 26, 1976

[54] APPARATUS FOR AUTOMATICALLY CONTROLLING THE TEMPERATURE OF A FREE-FALLING GLASS GOB

[76] Inventor: George I. Goodwin, P.O. Box 348, Bloomfield Hills, Mich. 48013

[22] Filed: June 4, 1975

[21] Appl. No.: 583,535

[52] U.S. Cl. .................................. 65/162; 65/128; 65/164; 65/326
[51] Int. Cl.² ........................................... C03B 7/00
[58] Field of Search ............... 65/29, 326, 327, 164, 65/128, 162, 24, 26

[56] References Cited
UNITED STATES PATENTS

| | | | |
|---|---|---|---|
| 3,244,495 | 4/1966 | Apple et al. | 65/327 X |
| 3,332,765 | 7/1967 | Champlin | 65/162 |
| 3,416,908 | 12/1968 | Goodwin et al. | 65/355 X |
| 3,479,206 | 11/1969 | Patterson | 65/26 X |
| 3,672,860 | 6/1972 | Keller | 65/24 |

*Primary Examiner*—Arthur D. Kellogg
*Attorney, Agent, or Firm*—Robert E. Wagner; Robert E. Browne; Gerald T. Shekleton

[57] ABSTRACT

An apparatus for providing a uniform thermal history of a free-falling glass gob having a hollow, heat-resistant conveyor tube extending between the point of shear of the molten glass and the desired mold to which the glass is to be directed and having an electrical heating means associated with at least a portion of the tube which may be controlled by a control means to transfer thermal energy through the tube to the glass gobs passing within the tube, the control means being fed information received from sensing means located at selected points along the tube which is activated by infrared rays transmitted through openings in the tubing by the glass gobs, which temperature information is transmitted to the control means and integrated to determine the operation of the heating means.

19 Claims, 5 Drawing Figures

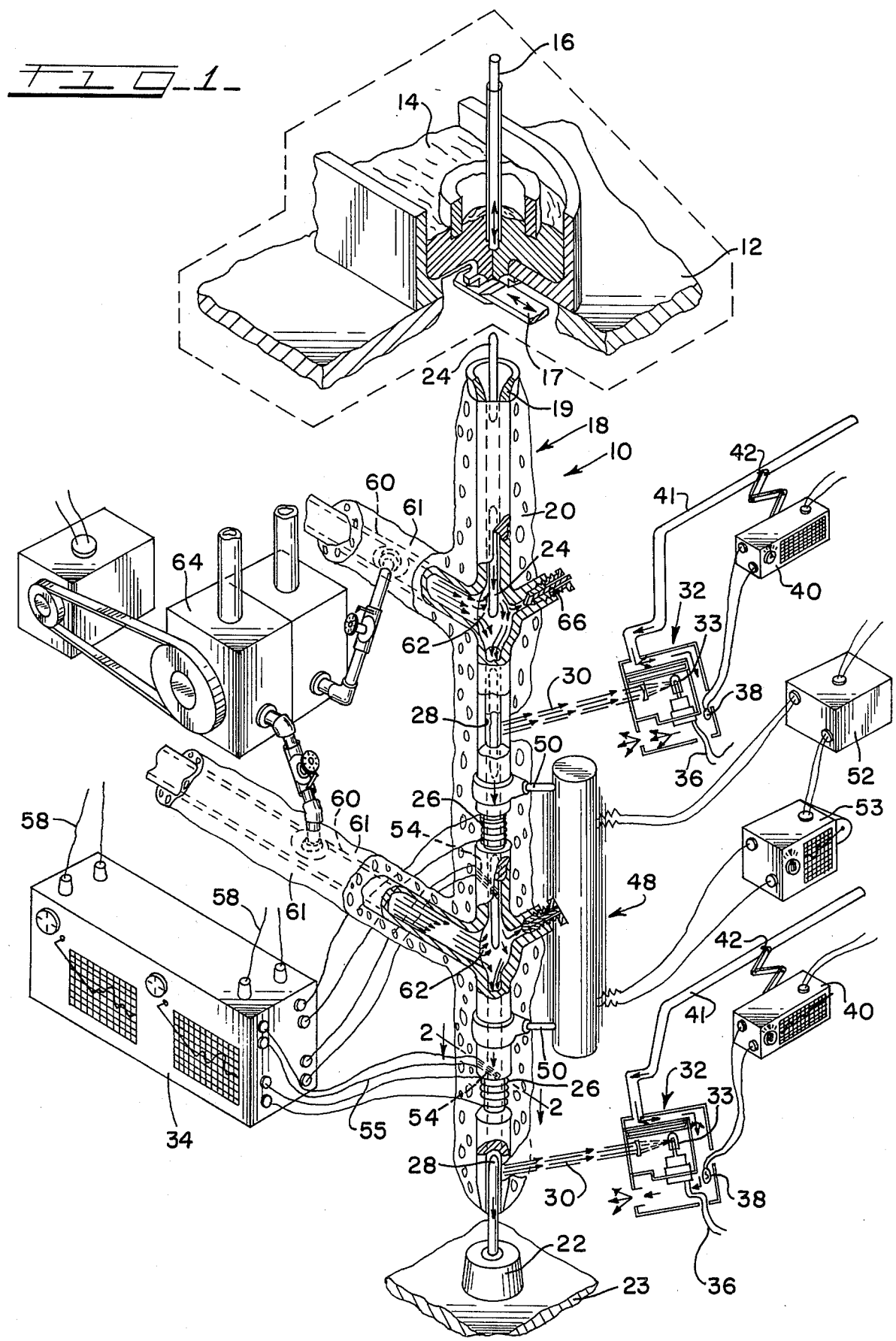

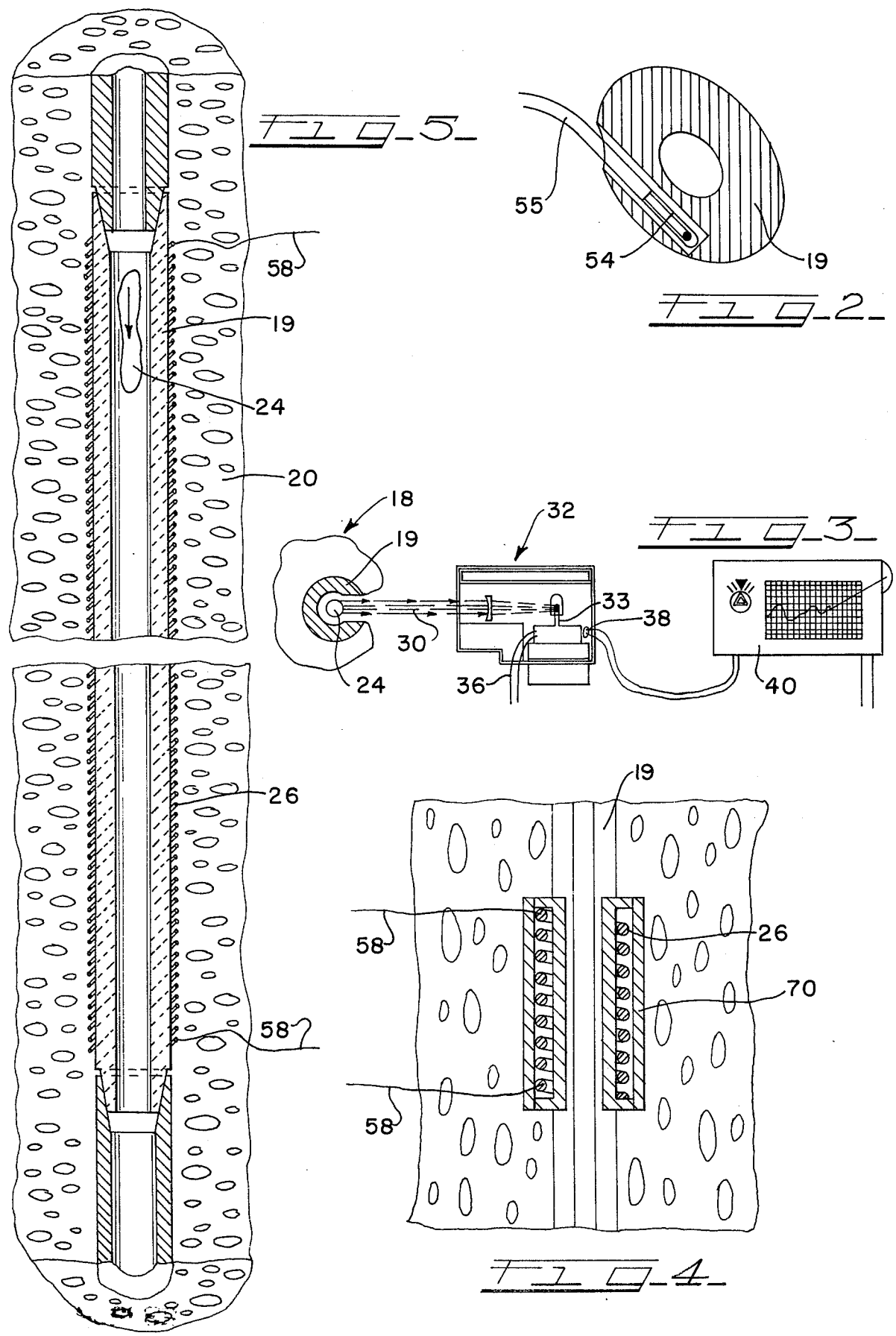

APPARATUS FOR AUTOMATICALLY CONTROLLING THE TEMPERATURE OF A FREE-FALLING GLASS GOB

BACKGROUND OF THE INVENTION

This invention relates to an apparatus for carefully and accurately controlling the thermal history of a glass gob between the molten glass hearth and the molds during glass manufacturing.

One prevailing cause of defects in a product during glass manufacture is improper or non-uniform temperature. Such temperature variations may usually be attributed to a lack of control over the environmental conditions of the glass during the manufacturing operation. If the finished product is cracked or chipped, the glass itself may be too cold. If the finish is oval-shaped, flattened or pinched, the glass could be too hot. In U.S. Pat. No. 3,416,908, issued Dec. 17, 1968, entitled "Environmental Control System for Glass Manufacturing" by George I. Goodwin and Robert C. Coblentz, a solution to some of the problems of environmental control was set forth. In this patent, a means to maintain control over temperature, pressure and humidity were disclosed, whereby the thermal history of glass could be predetermined for consistent quality and increased production. The invention described in that patent was directed to environmental control of the glass or machine parts by "modified air" during the glass manufacturing process. It set forth a significant step in obtaining better glass products at increased production rates without relying on prior, rather ineffective, methods of simply circulating outside air.

It has been discovered, however, that in order to obtain complete control over a glass manufacturing system, the temperature of the glass between the hearth containing the molten glass and the molds must also be considered and controlled. While U.S. Pat. No. 3,416,908 suggested that modified air, obtained by the method set forth in that patent, could be fed into the chute down which the glass gobs fell from the hearth to the molds to control the temperature of the gob as it passes through the chute, it does not have the degree or speed of control desired for optimum uniformity. Because of the speed with which the gob moves along the chute under the acceleration of gravity, it is desirable to use a more direct and faster means of controlling the temperature of the gob to supplement the use of the modifying air, as suggested in the above patent.

Means have been suggested from time to time for maintaining a constant and uniform thermal history of a glass gob between its point of shear and the mold. For example, Whittemore (U.S. Pat. No. 1,310,225) teaches the use of a heating cup to contain individual severed gobs of glass which are heated by electrical coils and surrounded by a pressurized air bath. Wadsworth (U.S. Pat. No. 1,323,507) also teaches a temporary cup which catches a severed gob. Electric heaters heat an entire secondary block supporting the cup. Unfortunately, neither of these apparatus provide an automatic system for controlling the temperature of the glass, and both involve time delays reducing the production of glass.

SUMMARY OF THE INVENTION

The present invention involves an improved structure and system which may be used in connection with the above-identified patent to Goodwin et al. to obtain complete, automatic control of the environment surrounding the gob during the entire glass manufacturing process. The apparatus of this invention overcomes the problems of the prior art by providing a conveying means or gob chute having a thermally-conductive, highly heat-resistant ceramic conduit extending between the shearing means disposed below the molten glass hearth and the glass-forming molds, and having electrical resistance heating means placed around or within the ceramic conduit to allow thermal energy in the form of heat to be selectively added to the glass gobs as they fall under the influence of gravity through the conveying means. This added thermal energy preserves a uniform temperature of the glass gob from the point of shearing to the point of mold entry.

The present invention also provides a system for automatic environmental control in which a number of sensing means are positioned at selected points along the path of travel of the glass gob through the conveying means to sense infrared light emitted by the hot glass transmitted through windows in the conveying means. The sensing means then emit electrical signals corresponding to the temperature indicated by the infrared rays to a main control means having electronic circuitry which integrates the information from all such sensors and activates or deactivates the heating elements associated with the ceramic conduit to increase or decrease the temperature within the conveying means and thereby affect the temperature of the glass gobs falling through it in a direct and immediate manner. The gob temperature controlling system may be interrelated to the environmental control system for the molding and machining operations, as set forth in the prior issued patent of Goodwin et al. above to provide a complete and total optimum environment for glass manufacturing.

Accordingly, it is an object of the present invention to provide an apparatus for automatically and completely controlling the thermal history of a free-falling glass gob between the molten glass hearth and the glass molds.

It is another object of the present invention to provide for more automatic control of the temperature of a free-falling glass gob by sensing the temperature of the gob as it travels through a conduit means, comparing the sensed temperature to an optimum temperature and operating heating means associated with the gob conveying means to provide a uniform temperature of all free-falling gobs.

It is a further objject of this invention to provide an apparatus for directly heating a glass gob traveling between a shearing means and a glass mold having a heating coil associated with a thermally conductive highly heat resistant material forming a conveying means for the gob.

It is one more object of the present invention to provide an apparatus for controlling the temperature of a free-falling glass gob between a molten glass hearth and a mold having a means for heating the gob as it travels along a conveying means between the hearth and the mold, and means for sensing the temperature of the gob and indicating such temperature to control means which operates the heating means in accordance with the optimum desired temperature of the gob to maintain a uniform thermal history thereof.

It is still another object of the present invention to provide a system and apparatus for automatically maintaining a constantly controlled temperature of a free-falling glass gob between a molten glass hearth and a mold which may be used in conjunction with a modifying air system supplying air of controlled temperature, humidity and pressure to both the glass and glass manufacturing machinery during a glass manufacturing process, to assure uniform and stable environmental conditions.

These and other objects of the present invention will become apparent from the following description taken in conjunction with the drawings illustrating a preferred embodiment wherein:

FIG. 1 is a partially schematic view of the system and apparatus for controlling the temperature of a free-falling gob as described in this invention;

FIG. 2 is a horizontal cross-sectional view taken generally along line 2—2 of FIG. 1 showing a temperature-sensing device located along the path of the free-falling glass gobs;

FIG. 3 is a schematic view of one of the temperature-sensing means and recorders as shown in FIG. 1;

FIG. 4 is a vertical cross-sectional view showing one possible embodiment for the heating element adjacent the conduit means for conveying a free-falling glass gob; and FIG. 5 is a vertical cross-sectional view showing another possible relationship between the heating means and the ceramic conduit for conveying a free-falling glass gob as described in the present invention.

DESCRIPTION OF THE INVENTION

Referring now to the drawings and, in particular, to FIG. 1, an apparatus and system for controlling the temperature of a free-falling glass gob according to this invention is indicated in general at 10. This temperature control system 10 is preferably located in a glass manufacturing operation between a hearth 12 containing molten glass 14 and one or more molds 22 located on a mold platen 23. In most conventional glass manufacturing machinery, molten glass is metered by a plunger 16, cut into gob shapes by a shearing means 17 and carried downward to a plurality of molds on a mold platen by a conveying means or gob chute. A number of gob chutes corresponding to the number of molds may be used or a single chute which rotates with respect to the mold platen over the centers of each mold or in which the mold platen rotates relative to a stationary gob chute. For the purposes of illustration only, this invention shows a single gob chute 18 and a single mold 22.

The gob chute 18 includes a hollow conduit means or tube 19 which is preferably formed of a ceramic material having a high thermal conductivity while maintaining a high strength at high temperatures. This combination of strength at high temperatures is not found in most other construction materials and, therefore, ceramic is preferred. However, any material meeting these requirements may also be used. The ceramic conduit 19 is normally joined in four foot sections which are tapered inwardly as they extend downwardly toward the molds to prevent any possible adhesion of the glass gobs, such as 24, to the sides of the ceramic conduit or at the joints. The ceramic conduit 19 forms a delivery passageway for the glass gobs and is surrounded by thermal insulation 20 to maintain the desired temperature within it and prevent the outward radiation of thermal energy.

It has been difficult if not impossible in previous glass manufacturing systems to maintain a constant, optimum temperature of the glass gobs as they fall from the hearth to the mold down through the gob chute or so that the gob has a desired temperature when it enters the mold. However, this invention provides a novel and effective solution to this problem by placing resistance-type heating coils 26 at selected points along the length of the ceramic conduit 19, forming the interior of the gob chute 18. While such coils 26 could be disposed along the entire length of the chute 18, such extensive use of the heating element has not been found to be necessary. This uncomplicated means of heating the ceramic material forming the gob passageway and thereby transferring thermal energy through the ceramic to the gobs 24 as they fall through the chute enables a constant glass temperature to be maintained despite the length of the chute or the velocity of the falling gobs. As the gobs 24 pass through these heated zones, they will absorb the thermal energy necessary to keep their temperature at a desired level.

It is also significant that in the present invention the operation of these heating means are automatically controlled by a sophisticated system which measures the actual temperature of a falling gob and corrects the temperature of the gob by activation of the heating elements 26 to adjust it to the optimum and desired temperature. This control system includes conduit windows 28 which are formed in conduit 19 at selected points along the length of the chute 18 and preferably adjacent the heating coils 26. These windows 28 allow the transmission of thermal energy in the form of infrared rays 30 emitted by the extremely hot glass gobs 24 through them toward temperature sensing means 32 positioned adjacent each window 28.

Such temperature sensing means 32 may be any suitable means to sense the temperature of the glass gobs as indicated by the infrared rays received but preferably includes a conventional radiation pyrometer assembly of any standard make disposed in an enclosed system or box 35 and subjected to air of controlled temperature and humidity as supplied by modifying air passing through a tube 41 into the box 35. The temperature of the sensing box 35 is sensed by a thermocouple 38 and such information relayed to a pyrometer temperature control and recorder 40. This recorder and control 40, by varying the amount of modifying air admitted to box 32 through movement of the damper 42 controlling flow of air through tube 41, attempts to maintain the environment of the box at a constant level and prevent overheating of the pyrometer. The temperature sensed by the pyrometer 33 and each of the temperature sensing means 32 shown in FIG. 1 is conveyed in the form of discrete electrical signals, corresponding to each particular temperature sensed by electrical conduit means 36 to a system control box 34 which will be explained in further detail below.

In order to assure a frictionless as possible descent of the glass gobs 24 through the conduit 19 toward the molds 22, a vibration means 48 is provided which is mechanically connected to the conduit 19 by mountings 50 and which, upon energization by a power unit 52, will induce vibrations of ultrasonic frequency into the chute 18 and the ceramic conduit 19. These vibrations will not only prevent sticking of glass gobs to the conduit walls but will also affect the gobs themselves, to assure uniform density and configuration of such gobs. The performance of this vibration unit is recorded on a recorder 53.

The "modifying air," referred to above, means air taken from outside the system whose temperature, humidity and pressure has been artificially altered, as taught in U.S. Pat. No. 3,416,908 to Goodwin et al. Such air is forced into and along the ceramic conduit 19 to provide a controlled environment for the movement of the gobs 24 along it. This modifying air may be forced into the system through air tubes or conduits 60, shown in FIG. 1, which are surrounded by insulation 61 to keep the air, as modified, of the correct temperature, pressure and humidity. The flow of modified air is indicated by the arrows 62 within the chute 18. Such air flow circulates around and downward through the gob chute to assist in the movement of the glass gobs 24 and to assist in controlling their ultimate temperature and humidity. Bleeder valves 66, which are of a standard screw type having a spring-biased poppet, are located adjacent the entrance of the junction of the modifying air conduit 60 and the conduit 19 to control the air pressure and prevent any back or upward movement of the pressurized modifying air.

Also connected to the modifying air conduits 60 are lubrication pumps 64 including a conventional pumping means which injects a lubricant into the stream of modifying air which is then carried to chute 18 and provides an extremely slippery surface along which the glass gobs may slide to prevent their sticking to the sides of the conduit 19. While such lubricant may be petroleum based, lubricating powders such as fluorinated hydrocarbons, e.g. $CF_x$ or tetrafluoroethylene, it may be injected into the modifying air stream, provided a turbulence is created in the stream sufficient to keep these particles in suspension. Such particles would coat the interior walls of the conduit to provide an extremely frictionless surface along which the glass gobs can move and also prevent excessive wear on the interior surfaces of the chute. An alternative method of providing this frictionless surface would be to actually change the chemical composition of the inside surface of the ceramic conduit 19 with a lubricating compound such as $CF_x$ through a fluorinating process such as disclosed in U.S. Pat. No. 3,674,432 to J. L. Margrave et al. A significant object of the present invention is to provide a means for improving the movement of glass gobs along a conveying means by eliminating friction and thereby reducing wear due to extreme heat and movement. As the lubricity of the interior surface of the conveying means is improved, and as the temperature and humidity of the glass gob is controlled by the modifying air, it facilitates control of the velocity of the falling glass gob and the impact of the gob in the mold. Impact is important since the speed and shape of the gob when it enters the mold substantially affect the settling of the gob within the mold and the ultimate shape and condition of the glass products.

The system control box 34 consists of well known electronic means which receive the temperature data information from the temperature sensing means 32 including the pyrometer 33, as electrical signals communicated through electrical conduit 36 while simultaneously receiving electrical information indicating the temperature within the ceramic conduit 19 through electrical conduit 55 as transmitted by thermocouples 53 located adjacent heating coils 26. Control box 34, therefore, is not only sensitive to the temperature of the conduit 19 but also the actual temperature of the gobs as they fall through the chute 18 toward the molds 22. The conventional electronic means in box 34 integrates all the information supplied and adjusts accordingly all the heating means and the modifying air so that glass charges entering the mold will be of the desired temperature, humidity, viscosity and other characteristics to assure a perfect glass product. The chart 68 shown on the face of the control box 34 provides a graphic display of the temperatures of the gobs passing through the conveyor tube. One chart may be supplied for each sensing point and heating coil and compared with the other charts to assure that the gob temperature is constant and uniform throughout the conveyor tube.

As mentioned above, it has not been found necessary, in all cases, to place the heating coil along the entire length of the gob chute 18. FIG. 4 shows a conveyor tube 120 manufactured of a ceramic material having a hollow ceramic mounting sleeve 70 containing heating coils 26 mounted on it at one point along the length of tube 120. The ceramic mounting sleeve 70 can be heated up to 2000° C. without damage and will permit heating of gobs within inner ceramic tube 19 to any degree necessary. Wires 58 extend between the heating coils 26 and a control box 34, as shown in FIG. 1, to control operation of the coils.

FIG. 5 illustrates a typical four-foot section of ceramic conduit having tapered joints in the direction of gob movement so that travel of the gob 24 along the chute is not hindered. In this section, it is noted that the heating coils 26 surround an entire four-foot length of the conduit and provide a larger heating area over which a corrected control temperature may be sustained to modify the temperature of the gob as necessary.

In summary, this invention provides an apparatus which functions as an automatic system according to a prescribed method to control the temperature, humidity and viscosity of a free-falling glass gob between its point of shearing and the point where it enters the mold. This invention assists in achieving the best possible glass article by maintaining a nearly perfect thermal history of the glass gob during this period of time. This invention is intended to complement that described in the above-identified patent to G. I. Goodwin et al., and when used with the system described in that patent, will increase the rate of article production and the number of acceptable glass articles per time period of production.

Upon consideration of the foregoing, it will become obvious to those skilled in the art that various modifications may be made without departing from the invention embodied herein. Therefore, only such limitations should be imposed as are indicated by the spirit and scope of the appended claims.

I claim:

1. An apparatus particularly adapted for use in glass manufacturing to control the temperature of free-falling molten glass gobs between a hearth or tank containing molten glass and mold means for receiving said glass gobs, including conduit means extending generally between said hearth and said mold means, said conduit means being formed of a strong, thermally conductive material which is resistant to the high temperatures of said molten glass gobs, said conduit means defining a passageway of sufficient dimension to convey said glass gobs along it from said hearth to said mold means, modifying air means in communication with said passageway to introduce modified air into said passageway, electrical heating elements associated with said conduit means at desired locations along the length thereof and operable to transfer heat through said thermally conductive conduit means to said glass gobs as said gobs move along said passageway formed by said conduit means to thereby control the temperature of said gobs and maintain a desired uniform temperature of said gobs between said hearth and said molds.

2. The apparatus set forth in claim 1 wherein sensing means are placed at selected points along the length of said conduit means to sense the temperature of each glass gob as it moves downwardly along said conduit means, said sensing means transmitting a signal to control means to activate said control means, said control means being in communication with said electrical heating elements to operate said electrical heating elements to transfer heat through said thermally conductive conduit means to maintain said glass gobs at a uniform temperature during their fall between said hearth and said molds.

3. The apparatus set forth in claim 2 wherein said sensing means includes means to receive light of approximately infrared wavelength emitted by said molten glass gobs, said means to receive said light being positioned adjacent openings formed in said conduit means to allow transmission of said infrared light therethrough to means to receive said light.

4. The apparatus set forth in claim 3 wherein modifying air is introduced to each of said sensing means to provide a constant temperature environment for said means to receive said light by circulating air temperature sensing and control means in communication with said means to receive said infrared light to regulate the the supply of modified air to control the environmental conditions surrounding said means to receive said light.

5. The apparatus set forth in claim 1 wherein said modifying air comprises air having a controlled temperature and humidity to facilitate downward movement of said glass gobs relative to said conduit means and provide a controlled environment for said glass gobs.

6. The apparatus set forth in claim 5 wherein lubrication means in communication with said passageway of said conduit means are activated as desired to introduce a lubricant into said modified air and creating a turbulence within said modified air sufficient to keep said lubricant in suspension therein for contacting said passageway of said conduit means to facilitate movement of said glass gobs therealong.

7. The apparatus set forth in claim 1 wherein said conduit means is formed of a ceramic material having good thermal conductivity and capable of maintaining a high strength at the high temperatures associated with molten glass.

8. The apparatus set forth in claim 7 wherein said ceramic material forming said conduit means includes elongated hollow ceramic tubes connected in end-to-end relationship, each of said tubes having an inside annular surface which is formed of a fluorinated hydrocarbon structure to reduce the wear on said surface and improve its lubricity.

9. In a glass molding apparatus including a hearth or tank for containing molten glass for molding, glass shearing means to cut said molten glass urged from said hearth into individual glass gobs of known volume, and mold means to receive said glass gobs and form them into a generally desired shape; the improvement including glass gob conveying means to carry the glass gobs by gravity from the point of shearing to said mold means while maintaining said glass gobs at a uniform, optimum temperature such that each glass gob has a desired viscosity, humidity and velocity of impact when it reaches said mold means and, therefore, assures optimum production and quality of the molded glass articles, said conveying means having strong, heat resistant, thermally conductive, generally tubular conduit means extending generally between said shearing means and said mold means and defining an open-ended passageway of sufficient interior dimension to convey said glass gobs from said shearing means to said mold means, modifying air means in communication with said passageway to introduce modified air into said passageway, electrical heating elements associated with said conduit to surround said passageway along at least a portion of the length of said conduit means, said electrical heating elements being operable to transfer thermal energy through said conduit means to said gobs moving within said passageway, and control means to regulate the operation of said electrical heating element and the amount of thermal energy transferred through said conduit means to said gobs and thereby to control the temperature of said gobs.

10. The improvement set forth in claim 9 wherein said control means includes sensing means placed at selected points along the length of said conduit means to sense the temperature of each glass gob as it moves downwardly along said conduit means, said sensing means transmitting a signal to a temperature control and recording means to activate said control and recording means, said control and recording means being in communication with said heating elements to operate said heating elements to transfer thermal energy through said conduit means to maintain said glass gobs at a uniform temperature during their fall between said hearth and said molds.

11. The improvement set forth in claim 10 wherein said sensing means includes means to receive light of approximately infrared wavelength emitted by said molten glass gobs, said means to receive said light being positioned adjacent openings formed in said conduit means to allow transmission of said infrared light therethrough to means to receive said light.

12. The improvement set forth in claim 11 wherein modifying air is introduced to each of said sensing means to provide a constant temperature environment for said means to receive said light by circulating air of controlled temperature and humidity therearound, and air temperature sensing and control means in communication with said means to receive said infrared light to regulate the supply of modified air to control the environmental conditions surrounding said means to receive said light.

13. The improvements set forth in claim 9 wherein said modified air introduced into said passageway has a controlled temperature and humidity to facilitate downward movement of said glass gobs relative to said conduit means and provide a controlled environment for said glass gobs.

14. The improvement set forth in claim 13 wherein lubrication means in communication with said passageway of said conduit means are activated as desired to introduce a lubricant into said passageway to facilitate movement of said glass gobs therealong.

15. The improvement set forth in claim 9 wherein said conduit means is formed of hollow ceramic tubes connected in end-to-end relationship, said tubes having good thermal conductivity and a high strength at the high temperatures associated with molten glass.

16. A temperature control system to control the temperature and environmental conditions of a free-falling glass gob between a hearth containing molten glass positioned above shearing means designed to cut the molten glass from said hearth into individual gobs, and molds to form said gobs into a generally desired shape, said temperature control system including conduit means extending generally between said shearing means and said molds, said conduit means being formed of a strong, thermally conductive material which is resistant to the high temperatures of said molten glass gobs, said conduit means having a passageway for conveying said glass gobs from said shearing means to said molds, modifying air means for introducing air into said passageway, electrical heating elements disposed in thermally transferring relationship with said conduit means along a desired length thereof and operable to transfer heat through said conduit means to said glass gobs as said gobs move downwardly along said conduit means toward said molds, heat sensing means selectively positioned along the length of said conduit means to sense the temperature of said gobs moving within and along said conduit means, control means in communication with said sensing means and said electrical heating elements and operable in response to signals from said sensing means indicative of the temperatures of said gobs to activate said electrical heating elements to thereby control the temperature of said gobs as desired such that the temperature of each gob remains uniform between said hearth and said molds.

17. The system set forth in claim 16 wherein said sensing means includes means to receive light of approximately infrared wavelength emitted by said molten glass gobs, said means to receive said light being positioned adjacent openings formed in said conduit means to allow transmission of said infrared light therethrough to means to receive said light.

18. The system set forth in claim 17 wherein each of said sensing means includes a pyrometer to receive said infrared light rays which is disposed in a housing about which air modified to a desired temperature, pressure and humidity is circulated to maintain a constant control temperature and humidity therein, and to prevent overheating of said pyrometer.

19. The system set forth in claim 16 wherein said control means includes electronic means to receive the information from each of said sensing means relating to the condition of each molten glass gob moving through said conduit means, integrate all of said information and then operate said heating means as necessary in order to assure a uniform and perfect thermal history of each glass gob between the hearth and the molds.

\* \* \* \* \*